United States Patent [19]

Hyppanen

[11] Patent Number: 5,540,894
[45] Date of Patent: *Jul. 30, 1996

[54] METHOD AND APPARATUS FOR PROCESSING BED MATERIAL IN FLUIDIZED BED REACTORS

[75] Inventor: Timo Hyppanen, Karhula, Finland

[73] Assignee: A. Ahlstrom Corporation, Noormarkku, Finland

[*] Notice: The term of this patent shall not extend beyond the expiration date of Pat. No. 5,332.553.

[21] Appl. No.: 66,277

[22] Filed: May 26, 1993

[51] Int. Cl.⁶ .................... F27B 15/14; F27B 15/16; F27B 15/08
[52] U.S. Cl. .................. 422/146; 422/147; 122/4D; 165/104.16; 165/104.18; 110/245
[58] Field of Search ................. 422/146, 139, 422/147, 145; 110/245; 122/4 D; 165/104.16, 104.18

[56] References Cited

U.S. PATENT DOCUMENTS

| | | | |
|---|---|---|---|
| 3,921,590 | 11/1975 | Mitchell et al. | 122/4 D |
| 4,686,939 | 8/1987 | Strömberg | 122/4 D |
| 4,796,691 | 1/1989 | Large et al. | 165/104.10 |
| 4,813,479 | 3/1989 | Wahlgren | 165/104.16 |
| 4,931,260 | 6/1990 | Molerus et al. | 422/146 |
| 5,069,170 | 12/1991 | Gorzegno et al. | 122/4 D |
| 5,242,662 | 9/1993 | Toht | 422/142 |
| 5,281,398 | 1/1994 | Hyppanen et al. | 422/147 |
| 5,323,553 | 7/1994 | Hyppanen | 422/147 |
| 5,341,766 | 8/1994 | Hyppanen | 122/4 D |
| 5,345,896 | 9/1994 | Hyppan | 122/40 |
| 5,386,974 | 2/1995 | Hardie et al. | 266/157 |
| 5,391,357 | 2/1995 | Stoholm | 422/145 |
| 5,395,596 | 3/1995 | Winkin et al. | 422/142 |

FOREIGN PATENT DOCUMENTS

| | | |
|---|---|---|
| 1508777 | 4/1978 | United Kingdom . |
| 2072545 | 10/1981 | United Kingdom . |
| 2203672 | 2/1988 | United Kingdom . |
| WO9411284 | 5/1994 | WIPO . |

*Primary Examiner*—Robert J. Warden
*Assistant Examiner*—N. Bhat
*Attorney, Agent, or Firm*—Nixon & Vanderhye P. C.

[57] ABSTRACT

Particles in a fluidized bed reactor (e.g. a circulating fluidized bed reactor) are discharged from the reactor chamber and then cooled (heat is recovered from them) in a processing chamber. This is accomplished in a particularly advantageous way by discharging the particles from the reactor chamber at a first level (e.g. through a non-mechanical seal or a classifying wall) into a lifting chamber. Upwardly flowing gas in the lifting chamber entrains the particles and lifts them into the processing chamber. After processing, the particles in the processing chamber are returned to the reactor chamber at level higher than the first level, at which point the pressure in the processing chamber is higher than the pressure in the reactor chamber. The particles may be classified in the lifting chamber by utilizing fluidizing gas to transport solid particles smaller than a predetermined size to the processing chamber while discharging larger particles from the bottom of the lifting chamber.

30 Claims, 4 Drawing Sheets a reactor chamber, with side walls defining the interior of the reactor chamber and a fluidized bed of solid particles in the lower part of the reactor chamber.

METHOD AND APPARATUS FOR PROCESSING BED MATERIAL IN FLUIDIZED BED REACTORS

BACKGROUND AND SUMMARY OF THE INVENTION

The present invention refers to a method and an apparatus for processing bed material in a fluidized bed reactor, having a reactor chamber, with side walls defining the interior of the reactor chamber and a fluidized bed of solid particles in the lower part of the reactor chamber.

In some fluidized bed processes it may be desirable to gather a portion of the particles forming the bed material for separate processing, e.g. cooling, before further processing that portion of the bed material in the reactor chamber. It has been suggested to discharge solid particles from a reactor chamber into a separate processing chamber and after processing thereof (e.g. cooling), to recycle the particles back into the reactor chamber.

In some processes it is advantageous to process only particles of a certain size range. Particles of a small size e.g. suitable for heat recovery are, however, due to fractionation in the lower part of the reactor chamber, often mixed with large particles or other large objects. This tends to prevent optimal heat recovery, heat transfer being more efficient in a bed of small particles. Large objects also tend to cause problems by e.g. clogging the heat transfer surfaces and also by causing mechanical damage.

Further problems to be solved when processing particles in a separate processing chamber arise with the recirculation of the material from the reactor chamber into the processing chamber and back into the reactor chamber. A pressure difference prevailing between the lower part of the reactor chamber and the processing chamber forces particles to flow from the reactor chamber into the processing chamber. But the recycling of the particles back into the reactor chamber requires mechanical or other transporting means to overcome the pressure difference.

The present invention provides an improved method and apparatus for processing bed material in a separate processing chamber connected to the reactor chamber of a fluidized bed reactor. The invention particularly provides an improved method and apparatus for recycling bed material between the reactor chamber and the separate processing chamber. The present invention employs a fluidized bed reactor for recycling bed material of a size smaller than a predetermined size through an external processing chamber, and recovers heat from bed material in an external processing chamber.

The method according to the invention for processing bed material in a fluidized bed reactor chamber, utilizes an outlet duct from the reactor, connected to a lifting chamber, in turn connected to a process chamber. The method comprises the steps of: (a) Discharging solid particles from the lower part of the reactor chamber at a first level of the fluidized bed through the outlet duct into the lifting chamber. (b) Pneumatically conveying solid particles with a conveying gas, as a particle suspension, upwardly in the lifting chamber, to a second level higher than the first level and into a processing chamber. (c) Forming a fluidized or fixed bed of solid particles in the processing chamber. (d) Processing the solid particles in the processing chamber. And, (e) recycling processed solid particles with conveying or fluidizing gas from the processing chamber into the reactor chamber, at a third level, higher than the first level.

Processed solid particles may additionally be recycled from the processing chamber into the reactor chamber at a fourth level, lower than the third level.

Exemplary apparatus for processing bed material in a fluidized bed reactor according to the invention comprises: A lifting chamber connected to the lower part of the reactor chamber. An outlet duct connecting the reactor chamber with the lifting chamber, the outlet duct being disposed at a first level in the reactor chamber, for discharging solid particles from the reactor chamber into the lifting chamber. A processing chamber connected to the lifting chamber, the processing chamber including a bed of solid particles. A connector duct connecting the upper part of the lifting chamber with the processing chamber. Means for introducing conveying gas (such as air) into the lifting chamber for pneumatically conveying solid particles from the lifting chamber through the duct into the lifting chamber. Means for processing solid particles in the processing chamber. And, a first inlet duct connecting the processing chamber with the reactor chamber, the first inlet duct disposed at a second level, higher than the first level, for recycling processed solid particles with conveying or fluidizing gas from the processing chamber into the reactor chamber.

The lifting chamber and the processing chamber are preferably disposed adjacent the reactor chamber to form a compact unit. A portion of a side wall of the reactor chamber may divide the lifting and processing chambers from the reactor chamber. Similarly the lifting chamber and the processing chamber may be constructed as a unit, and separated by a partition wall.

The first outlet duct may be disposed in the refractory lined lower part of the reactor chamber, in the side wall e.g. up to a 1000 mm level above the grid, or in an extension chamber below the grid level. The outlet duct is preferably disposed in the reactor chamber at a dense bed zone level, having >100 kg solids / $m^3$ gas, preferably 500–1500 kg/$m^3$. The first inlet duct is then preferably disposed at a level 500–5000 mm above the outlet duct.

The pressure prevailing in a fluidized bed reactor varies with the height of the bed. At a first low level in the dense bed zone of the reactor chamber the pressure $p_1$ may be much higher than the pressure $P_2$ at a higher second level at a less dense bed zone.

The present invention provides an easy way of recycling solid particles from a high pressure $p_1$ at a dense bed zone into a processing chamber and back into the reactor chamber without the need of mechanical or other complicated conveyors.

Solid particles are discharged from a dense bed zone at a first level in the reactor chamber by pressure difference into the lifting chamber, the pressure $P_3$ in the lifting chamber being lower than the pressure $p_1$ in the dense bed zone of the reactor chamber.

A nonmechanical seal, such as a gill seal or an L-valve, may be disposed in the outlet duct in order to prevent gases from flowing from the lifting chamber into the reactor chamber and to control solids flow into the lifting chamber. A gill seal is formed by several narrow slots, i.e. slot formed openings, arranged on top of each other. The slots are preferably slightly inclined from the horizontal, each slot forming a nonmechanical seal. The amount of bed material flowing into the lifting chamber may be controlled by fluidizing air nozzles provided at the nonmechanical seal.

In the lifting chamber the solid particles are lifted as a particle suspension by pneumatic conveyance to a second, higher, level. At the second level in the reactor chamber the pressure $p_2$ is considerably lower than the pressure $p_1$ in the dense bed zone at the first, lower, level. The particle suspension is further conveyed at this second level into the processing chamber.

At the second level only a small pressure difference prevails between the reactor chamber and the processing chamber. The conveying gas forced to flow through the first inlet duct into the reactor chamber thus effects a pressure difference which prevents gases from flowing backwards from the reactor chamber into the processing chamber. A portion of the solid particles conveyed from the lifting chamber into the processing chamber may flow with the conveying gas through the first inlet duct directly back into the reactor chamber.

In the processing chamber solid particles are partially separated from the particle suspension due to the change in direction of flow and due to particle strand formation. Separated particles form a fluidized or fixed bed of solid particles in the processing chamber. Fluidizing gas and particles carried by the gas flow through the first inlet duct into the reactor chamber.

A second inlet duct may be disposed at a lower level in the processing chamber for recycling mainly particles from the fluidized or fixed bed by pressure or gravity into the reactor chamber. The pressure in the processing chamber varies with the height and density of the bed as does the pressure in the reactor chamber. The pressure $p_4$ in the processing chamber may be held at a higher level than the pressure $p_2$ in the reactor chamber at corresponding levels by increasing the bed density or height of the bed in the processing chamber. The pressure p4 may also be held higher than the pressure p2 by providing the processing chamber at a level high enough so that the pressure p2 is smaller than pressure p4.

According to the present invention it is possible to pneumatically lift solid particles in the lifting chamber to a considerably higher level, if necessary, in order to overcome the pressure in the reactor chamber. The pressure difference between the processing chamber and the reactor chamber forces solid particles to flow from the processing chamber into the reactor chamber and prevents gases from flowing from the reactor chamber into the processing chamber.

The second inlet may be disposed at substantially the same level as the outlet duct. However, then the pressure in the fluidized or fixed bed in the processing chamber has to be increased by increasing the density of the bed or by increasing the height of the bed to overcome the pressure in the reactor chamber.

The present invention utilizes these and other pressure differences for recycling solid material between the reactor chamber, lifting chamber and processing chamber. Especially utilized are pressure differences between the reactor chamber and lifting chamber on one hand, and between the reactor chamber and processing chamber on the other hand.

The bed material to be processed in the processing chamber may have been classified before being introduced into the reactor chamber, by providing a barrier or classifying wall across the inlet of the outlet duct. The barrier wall may be a partition wall having openings or slots preventing particles of a size larger than a predetermined size to flow therethrough into the outlet duct.

Alternatively the fractioning of the bed material may take place in the lifting chamber. Fluidizing air nozzles arranged in the bottom of the lifting chamber may be used to control the size of particles allowed to flow upwardly and through the duct into the processing chamber. Small particles are pneumatically transported into the processing chamber whereas larger objects are discharged through the bottom of the lifting chamber or are mechanically recycled back into the reactor chamber.

The lifting chamber may be used for discharging ash from a fluidized bed combustor. Ash may then be classified in the lifting chamber. Large inert ash particles are discharged from the system and fine flyash is transported into the processing chamber for further processing.

According to the invention only a controlled fraction of solid particles of a predetermined size may be allowed to flow into the processing chamber. The fractioning may take place when discharging particles from the reactor chamber, or when lifting solid particles upwardly in the lifting chamber. The fine solid particles are then advantageously further processed, e.g. cooled in a heat exchanger, in the processing chamber, without large objects causing trouble.

The present invention may be utilized for recovering heat from solid particles by disposing heat transfer surfaces in the processing chamber. The heat transfer may be controlled by fluidizing air introduced into the processing chamber. The processing chamber is especially suitable for generating high temperature steam, as the gas atmosphere therein contains only very small amounts, if any, of corrosive gaseous compounds.

In hot processes the wall between the reactor chamber and the housing including the lifting chamber and the processing chamber (as well as other walls in the chamber) may be constructed of water tube panels. The tube panels may be refractory lined and bent to form openings between them. On the other hand if classification of material is needed an outlet duct having a barrier wall is easily disposed in a refractory lined tube panel by making furrows in the refractory lining between the adjacent tubes and revealing the fin connecting the two tubes. Round holes or slots of desired size can thereafter be made in the fins.

A gill seal may be inserted in a refractory lined tube panel by bending adjacent tubes apart enough to provide space for the gill seal arrangement. The openings may be formed in different modes.

The present invention provides an improved method and apparatus for processing bed material in an external processing chamber, while in an improved way circulating a desired fraction of the material from the reactor chamber through the processing chamber and back into the reactor chamber.

The present invention thereby provides a method for processing material in an external processing chamber in a fluidized or fixed bed of particles, at a different temperature, different fluidization conditions, or different gas atmospheres.

DETAILED DESCRIPTION OF THE INVENTION

Figure 1:
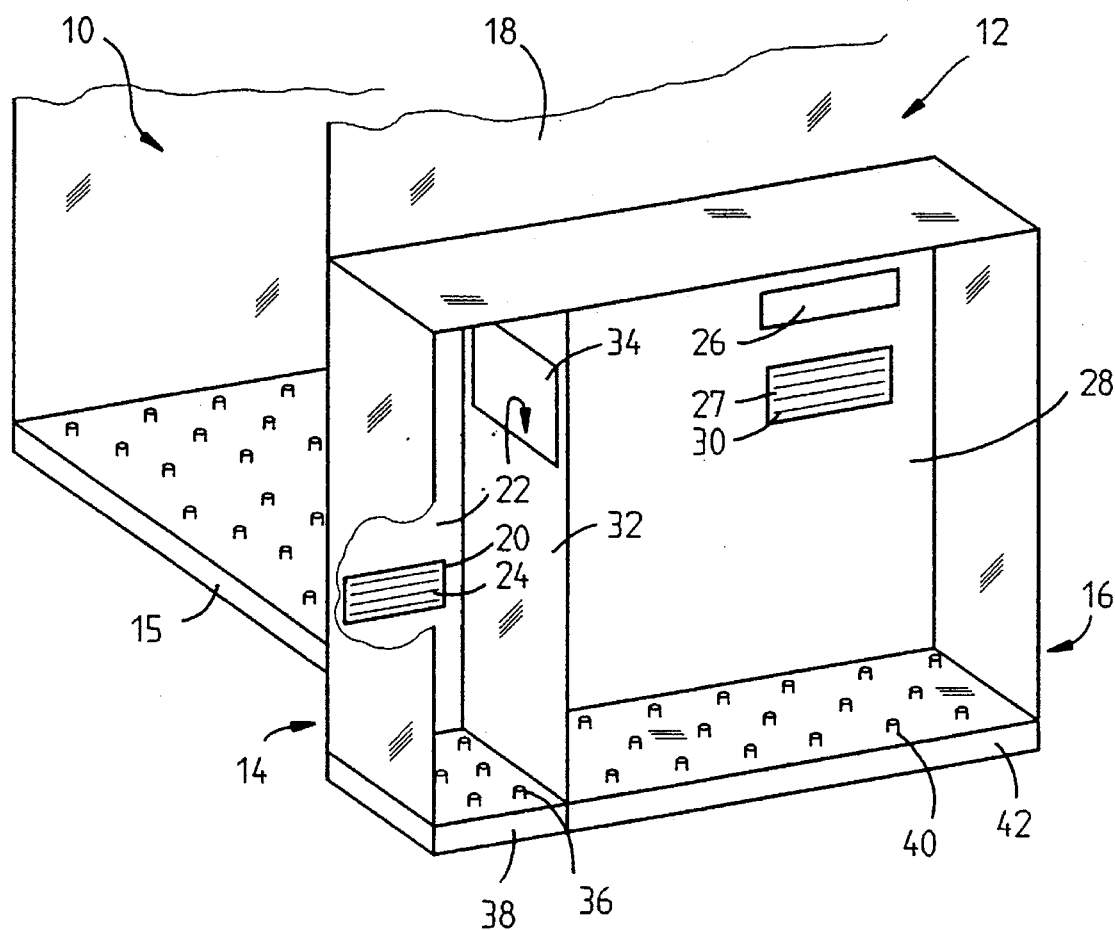
FIG. 1 is a schematic isometric view, with the side walls cut away for clarity of illustration, of an exemplary lifting chamber and a processing chamber according to the present invention.

FIG. 1 shows a part of a reactor chamber 10 in a fluidized bed reactor and a housing 12 disposed adjacent the reactor chamber 10 and including a lifting chamber 14 and a processing chamber 16. The housing 12 is disposed partly back to back with one side wall 18 of the reactor chamber 10. The housing 12 extends partly to a level below the bottom 15 of the reactor chamber 10.

An outlet duct 20 is provided at a first vertical level in the common wall portion 22 between the lifting chamber 14 and the reactor chamber 10. Solid particles flow through the outlet duct 20 from the reactor chamber 10 into the lifting chamber 14 due to the pressure difference between the chambers 10, 14. A gill seal 24 is disposed in the outlet duct 20 to prevent objects larger than a predetermined size from flowing from the reactor chamber 10 into the lifting chamber 14, and to prevent gas from flowing from the lifting chamber 14 into the reactor chamber 10.

Instead of an outlet duct 20, a plurality of small holes (not shown) may be formed in the wall 18 between the reactor chamber 10 and the lifting chamber 14. The holes should be large enough to allow particles of a predetermined size to flow through the wall 18, but small enough to prevent particles greater than the predetermined size (e.g. greater than a size which effects good heat exchange) from flowing through the wall 18.

A first inlet duct 26 is disposed at a second level, higher than the first level, in the common wall portion 28 between the processing chamber 16 and the reactor chamber 10, for allowing gas and solid particles entrained therein to flow into the reactor chamber 10. A second inlet duct 27 is provided below the first inlet duct 26. Particles flow by gravity or fluidization from the processing chamber 16 through the second inlet duct 27 into the reactor chamber 10. A gill seal 30 (FIG. 1) is provided in the second inlet duct 27 to prevent gas and solids from flowing backwards from the reactor chamber 10 into the processing chamber 16 and to control the flow of solids through the second inlet duct 27.

The housing 12 is divided by a partition wall 32 into the lifting chamber 14 and the processing chamber 16. The lifting chamber 14 is merely a lifting channel having a cross section substantially smaller than the cross section of the processing chamber 16. A duct or opening 34 in the upper part of the partition wall 32 connects the gas space of the lifting chamber 14 with the gas space of the processing chamber 16. The open area of the duct 34 corresponds to the horizontal cross section of the lifting chamber 14. Air nozzles of a grid 36 are provided in the bottom 38 of the lifting chamber 14. Air is introduced through the nozzles of grid 36 for pneumatically transporting a particle suspension upwards in the lifting chamber 14 and through the duct 34 into the processing chamber 16.

Air nozzles 40 are provided on the bottom 42 of the processing chamber 16 for fluidizing a bed 44 of particles formed in the processing chamber 16.

Figure 2:
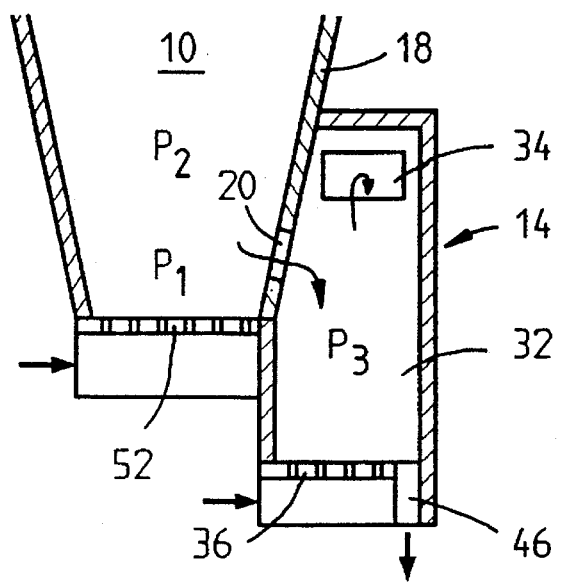
FIG. 2 is a schematic cross sectional view of the lifting chamber of FIG. 1, in association with the reactor chamber.

FIG. 2 shows a cross sectional view of a lifting chamber 14 provided beneath a reactor chamber 10. An outlet duct 20 is provided in a refractory lined lower portion of the side wall 18, the outlet duct 20 allowing particles to flow from the reactor chamber 10 into the lifting chamber 14. Air nozzles of grid 36 are provided in the bottom of the lifting chamber 14 for fluidizing the particles introduced into the lifting chamber 14 and for transporting particles smaller than a predetermined size upwardly toward the duct 34 in the partition wall 32. A single air inlet opening may be provided in the bottom of the lifting chamber 14 instead of a grid with nozzles 36. Larger particles and objects not transported by the fluidizing air are discharged through discharge outlet 46 provided in the bottom of the lifting chamber 14. The solids density in the lifting chamber 14 is much smaller than the solids density in the reactor chamber 10 at corresponding levels. In this embodiment, grid 36 is well below the air introduction grid 52 of chamber 10.

Figure 3:
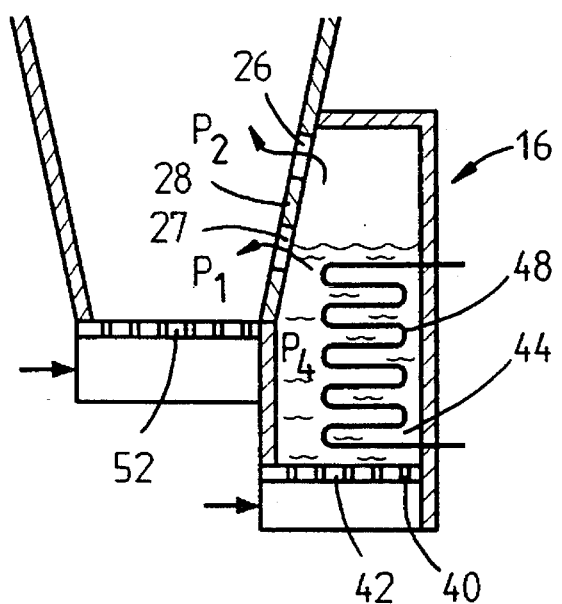
FIG. 3 is a schematic cross sectional view of the processing and reactor chambers of FIG. 1.

FIG. 3 shows a cross sectional view of a processing chamber 16 provided adjacent a reactor chamber 10. First and second inlet ducts 26 and 27 are provided in a common wall portion 28 between the reactor chamber 10 and the processing chamber 16. The first inlet duct 26 is above the bed upper level in the processing chamber 16, and the second inlet duct 27 is at a lower level in the bed area, allowing solid material to flow through the inlet duct 27 into the reactor chamber 10.

Heat transfer surfaces 48 are disposed in the bed 44 of particles in the processing chamber 16. Air nozzles 40 in the bottom 42 of the processing chamber 16 are used to fluidize the bed of particles and control heat transfer.

Figure 4:
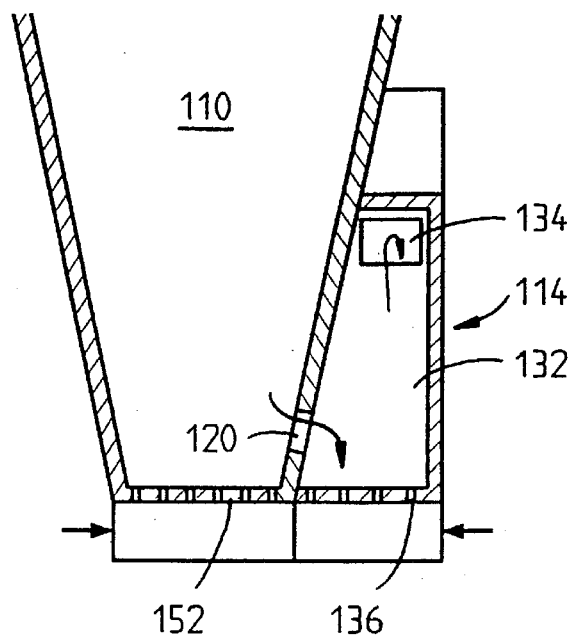
FIG. 4 is a schematic cross sectional view of another embodiment of lifting and reactor chambers according to the invention.
Figure 5:
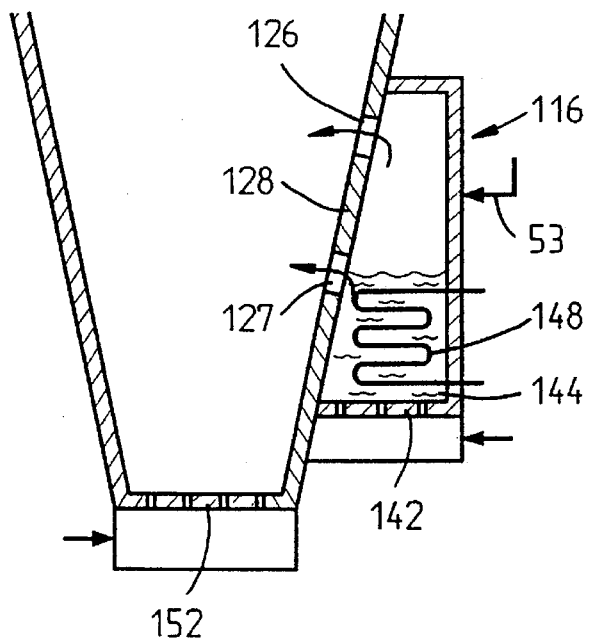
FIG. 5 is a cross sectional view of another embodiment of processing and reactor chambers according to the invention.

In the embodiments of FIGS. 4 AND 5 components comparable to those in the FIGS. 1–3 embodiment are shown by the same reference numerals only preceded by a "1".

FIG. 4 shows an embodiment of a lifting chamber 114 according to the present invention provided with its grid 136 at the same level as the grid 152 of the reactor chamber 110. FIG. 5 shows an embodiment of a processing chamber 116 according to the present invention, disposed with its grid 142 at a level above the level of the reactor chamber 110 grid 152. The reactor chamber 110 may be part of a circulating fluidized bed reactor, and particles separated from the gas discharged from chamber 110 may be reintroduced into chamber 110 through processing chamber 116, as indicated by conduit 53 in FIG. 5.

Figure 6:
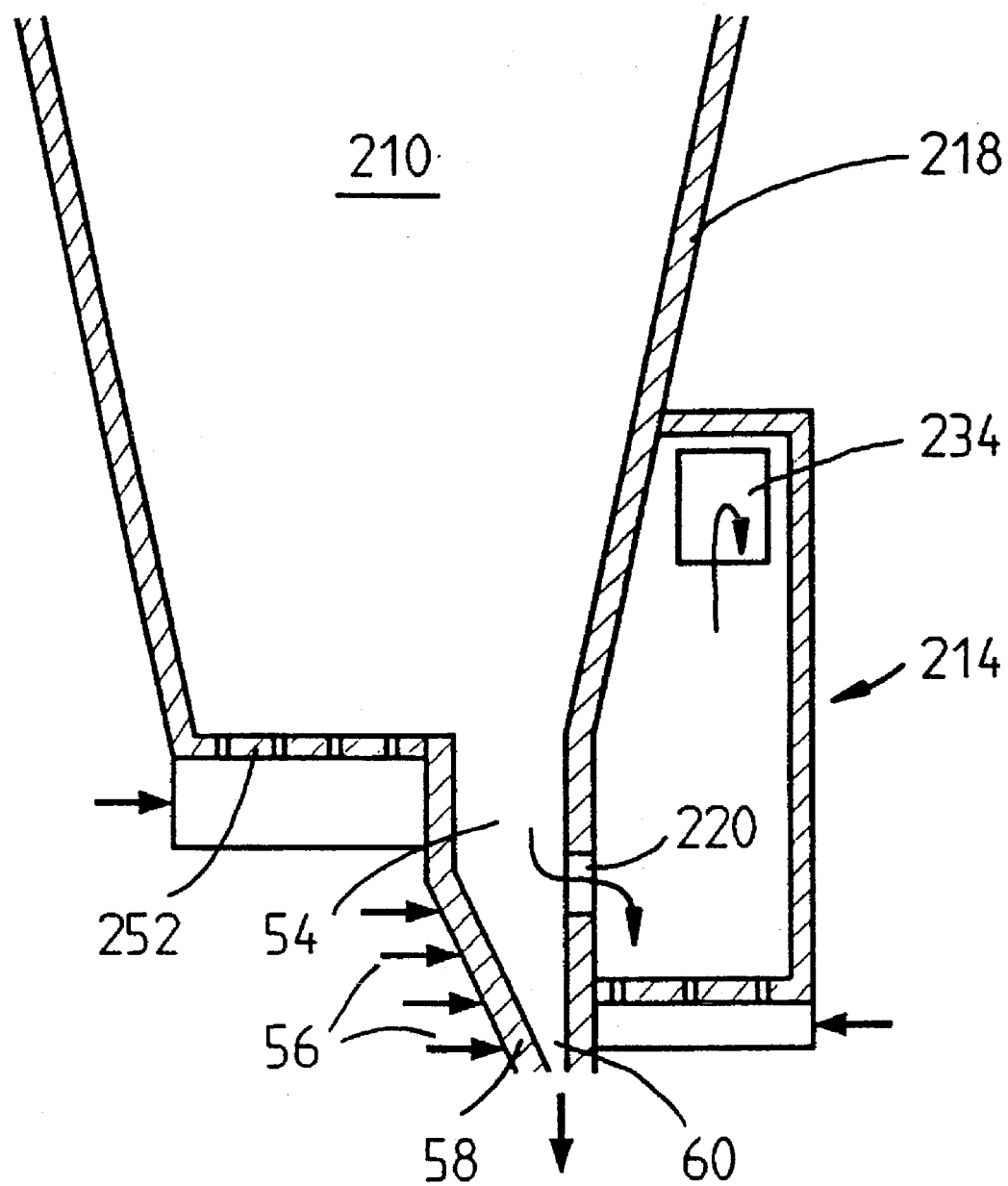
FIG. 6 is another cross sectional view of another embodiment of lifting and reactor chambers according to the invention.

In the embodiments of FIG. 6 components comparable to those in the FIGS. 4 and 5 embodiment are shown by the same reference numerals only preceded by a "2".

In the FIG. 6 embodiment the lifting chamber 214 is disposed so that at least half of it is below the reactor chamber 210 grid 252 level. An extension 54 of the reactor chamber 210 is also provided below the grid 252, for discharging solid material from the grid 252. Air nozzles 56 are provided in the side walls 58 of the extension 54 for classifying small particles from coarse objects. Coarse objects are discharged through an outlet 60. Small solid particles are allowed to flow through outlet duct 220 into the lifting chamber 214 provided adjacent to the extension 54.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A method for processing bed material in a fluidized bed reactor having a reactor chamber, with side walls defining the interior of the reactor chamber, a fluidized bed of solid particles in the reactor chamber, an outlet duct from the reactor chamber connected to a lifting chamber, in turn connected to a processing chamber, said method comprising the steps of substantially continuously:

(a) discharging solid particles from a lower part of the reactor chamber at a first level of the fluidized bed through the outlet duct into the lifting chamber;

(b) pneumatically conveying solid particles with a conveying gas as a particle suspension upwardly in the lifting chamber, to a second level higher than the first level, into the processing chamber;

(c) forming a fluidized or fixed bed of solid particles in the processing chamber;

(d) processing the solid particles in the processing chamber; and (e) recycling processed solid particles with conveying or fluidizing gas from the processing chamber into the reactor chamber, through a wall of the reactor chamber at a third level higher than the first level.

2. A method as recited in claim 1 wherein step (d) is practiced by recovering heat from the solid particles in the processing chamber.

3. A method as recited in claim 2 wherein step (d) is further practiced to fluidize the solid particles in the processing chamber to control the amount of heat recovered therefrom.

4. A method as recited in claim 1 wherein step (b) is practiced by providing a first pressure at the outlet duct, at the first level of the fluidized bed in the reactor chamber, and providing a second pressure in the lifting chamber at the first level, the second pressure being lower than the first pressure to thereby cause particles to flow from the reactor chamber into the lifting chamber.

5. A method as recited in claim 4 wherein step (b) is further practiced by controlling the fluid flow through the outlet duct with a non-mechanical seal.

6. A method as recited in claim 1 wherein step (b) is practiced by introducing fluidizing air at the outlet duct to control the flow from the reactor chamber into the lifting chamber.

7. A method as recited in claim 1 comprising the further step of classifying solid particles at the outlet duct to prevent particles having a dimension larger than a predetermined size to flow through the outlet duct.

8. A method as recited in claim 1 comprising the further step of classifying solid particles in the lifting chamber by introducing fluidizing air in such a manner so as to transport only solid particles smaller than a predetermined size pneumatically upwardly.

9. A method as recited in claim 8 comprising the further step of discharging particles larger than the predetermined size from the lifting chamber.

10. A method as recited in claim 8 comprising the further step of pneumatically transporting ash from the lifting chamber into the processing chamber.

11. A method as recited in claim 1 wherein step (e) is practiced, only in part, by causing solid particles in the processing chamber to overflow into the reactor chamber.

12. A method as recited in claim 1 wherein step (e) is practiced, only in part, by recycling solid particles into the reactor chamber through a non-mechanical seal.

13. A method as recited in claim 1 wherein the gas utilized in the practice of step (b) is secondary air for the reactor chamber.

14. A method as recited in claim 1 wherein the fluidized bed reactor comprises a circulating fluidized bed reactor.

15. A method as recited in claim 14, comprising the further step of separating particles from gases discharged from the circulating fluidized bed reactor and reintroducing the removed particles into the reactor chamber through the processing chamber.

16. A method as recited in claim 1 wherein the third level is higher than the second level.

17. A method as recited in claim 1 wherein the pressure in the reactor chamber at the third level is lower than the pressure in the processing chamber at the third level.

18. Apparatus for processing bed material in a fluidized bed reactor comprising:

a reactor chamber, with side walls defining the interior of said reactor chamber; and a fluidized bed of solid particles in the lower part of said reactor chamber;

said fluidized bed reactor comprising:

a lifting chamber connected to a lower part of said reactor chamber;

an outlet duct connecting said reactor chamber with said lifting chamber, said outlet duct being disposed at a first level in said reactor chamber, for discharging solid particles from said reactor chamber into said lifting chamber;

a processing chamber including a bed of solid particles;

a connector duct connecting an upper part of said lifting chamber with said processing chamber at a second level, higher than said first level;

means for introducing conveying gas into said lifting chamber for pneumatically conveying solid particles from said lifting chamber through said connecting duct into said lifting chamber;

means for processing solid particles in said processing chamber; and a first inlet duct connecting said processing chamber with said reactor chamber, said first inlet duct disposed at a third level, higher than said first level, for recycling processed solid particles with the conveying or fluidizing gas from said processing chamber into said reactor chamber.

19. Apparatus as recited in claim 18 further comprising heat transfer surfaces provided in said processing chamber.

20. Apparatus as recited in claim 18 further comprising a common wall defining said reactor and lifting chambers.

21. Apparatus as recited in claim 18 further comprising a common housing containing said lifting and processing chambers, a partition wall in said common housing separating said lifting chamber from said processing chamber.

22. Apparatus as recited in claim 18 further comprising air nozzles for fluidizing solid particles disposed in said processing chamber.

23. Apparatus as recited in claim 18 further comprising a classifying wall disposed in said outlet duct for preventing particles having dimensions larger than a predetermined size from entering said lifting chamber.

24. Apparatus as recited in claim 18 further comprising a non-mechanical seal disposed on said outlet duct.

25. Apparatus as recited in claim 24 wherein said non-mechanical seal is selected from the group consisting essentially of a gill seal and an L-valve.

26. Apparatus as recited in claim 18 further comprising a second inlet duct connecting said processing chamber with said reactor chamber, said second inlet duct being disposed below said first inlet duct.

27. Apparatus as recited in claim 26 further comprising a non-mechanical seal disposed in said second inlet duct.

28. Apparatus as recited in claim 18 wherein said fluidized bed reactor comprises a circulating fluidized bed reactor.

29. Apparatus as recited in claim 18 wherein said third level is higher than said second level.

30. Apparatus as recited in claim 18 wherein the pressure in the reactor chamber at said third level is lower than the pressure in said processing chamber at said third level.

* * * * *